J. W. Reid,
Band Pulley.
№ 51,218.          Patented Nov. 28, 1865.
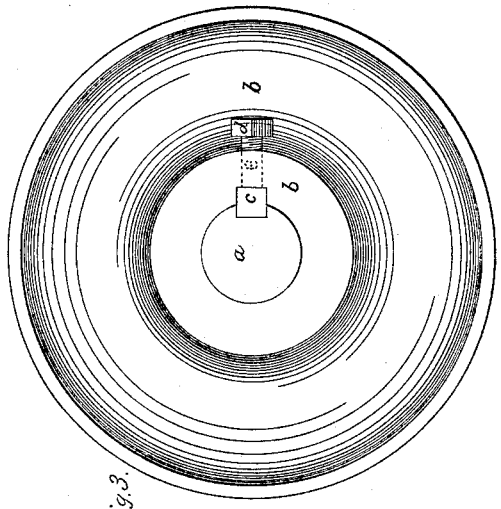
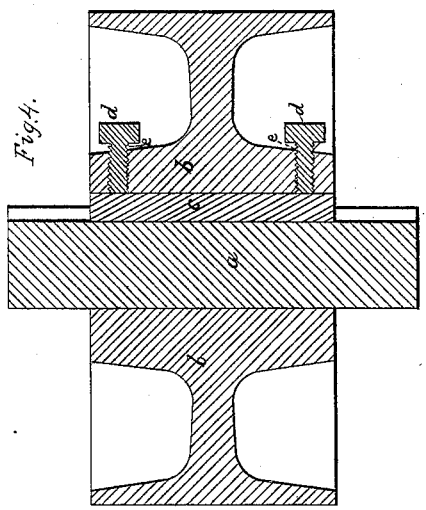
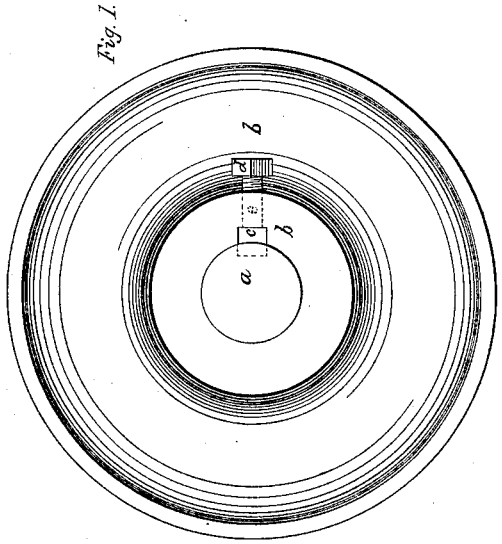
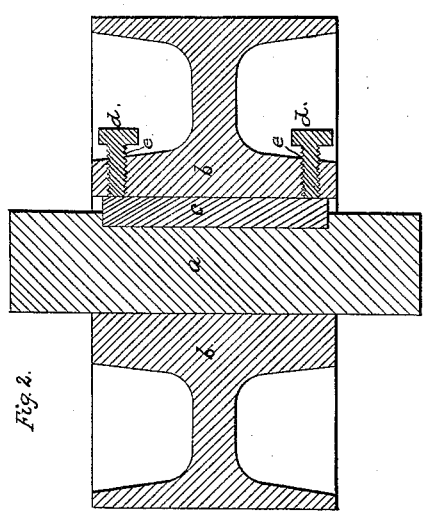
Witnesses:
Heyward Cutting
G. J. Marshall
Inventor:
J. Wyatt Reid
AM. PHOTO-LITHO. CO. N.Y. (OSBORNE'S PROCESS)

UNITED STATES PATENT OFFICE.

J. WYATT REID, OF NEW YORK, N. Y.

IMPROVEMENT IN SECURING PULLEYS.

Specification forming part of Letters Patent No. 51,218, dated November 28, 1865.

*To all whom it may concern:*

Be it known that I, J. WYATT REID, of the city, county, and State of New York, have invented a new and useful method of securing pulleys, gearing, arms, &c., to shafts, either revolving or rocking; and I do hereby declare that the following specification, taken in connection with the drawings, is a full, clear, and exact description thereof.

In the drawings, which illustrate the invention by representing the method of securing a pulley upon a shaft, Figure 1 is an elevation of a pulley secured upon a shaft according to the principles of my invention, and Fig. 2 is a section through the same on the axis of the shaft. Fig. 3 is an elevation of, and Fig. 4 a section through, a shaft and pulley, with a slight modification of the contrivance.

Pulleys, gearing-arms, &c., are usually secured to shafts either by keys or by set-screws. The former are taper and generally are driven into seats cut in both the pulley and the shaft. The latter have their ends resting upon the surface of the shaft. The former prevent the turning of the pulley upon the shaft by their resistance to the tendency of the shaft or pulley to cut or shear them off. The latter resist the same tendency by their friction upon the shaft or by entering small holes drilled into the shaft. Even in the latter case their resistance is comparatively small as it is measured by the area of the cross-section of the screw. Keys are therefore generally resorted to, and their fitting involves considerable labor and expense, as the keys must be taper and should fit accurately to the sufaces of the seats, both in the shaft and pulley, while, in consequence of the taper, a part of the cutting of the seat and of the shaping of the key is usually performed by hand. The fitting of the key usually requires repeated drivings in and out, so as to fit by trial, and this further adds to the expense.

When a pulley, gear-wheel, crank, or arm, has been thus secured to a shaft, much labor in driving out the key is required before the pulley can be removed or shifted, and it is often impossible to drive out the key, and the pulley-wheel or cranks must be burst and destroyed before it can be removed.

The taper form of the key is useful only in securing it in place, preventing its falling out and causing it to bear upon the seats. The resistance to the turning of the pulley upon the shaft depends, as before stated, upon its power to resist shearing or cutting in two.

By my invention I attain all the strength due to the use of a key, much diminish the labor and expense of fitting, and facilitate removal of the pulley, &c., after it has once been fixed; and my invention consists in the method of securing pulleys, gear-wheels, cranks, arms, &c., to rocking or revolving shafts by means of the combination of a key and set-screws, substantially as hereinafter described.

In the drawings, a shaft is represented at $a$ $a$, a pulley at $b$ $b$, a key at $c$ $c$, and set-screws at $d$ $d$.

A key-seat is to be cut on the shaft, as usual, and it may be either as long as the key, as in Figs. 1 and 2, or of indefinite length, as in Figs. 3 and 4, the latter being useful when a necessity may occur for shifting the pulley, &c., along the length of the shaft. A key-seat is also to be cut in the hub of the pulley or other article to be secured, and a key is to be made fitting closely to the key-seats on the sides thereof. This key may be either taper or of uniform cross-section, and I much prefer the latter, and I prefer to form the key and cut the seats by ordinary slotting and planing machines.

Holes $e$ $e$, one or more, are then to be drilled through the hub and tapped for the reception of screws. These holes may be perpendicular to the axis of the shaft or inclined thereto, and may be drilled by any usual or proper instrumentality. I prefer to drill the holes perpendicular to the shaft, and in the case of small pulleys and cog-wheels to pass the drill through the rim of the wheel or pulley and then into the hub; as by this plan the holes may be drilled perpendicular to the shaft by an ordinary drilling-machine. Proper set-screws are now to be procured, and the pulley is ready for being secured.

The key is now to be put in the seat on the shaft if that seat is no longer than the key, and the pulley is to be slipped over it, and if the seat on the shaft is long enough the pulley may be slipped on first and the key put in afterward. It is not necessary that the key should fit more than hand-tight. When the pulley and key are in place, the set-screws are to be set up tight, and it is plain that the pulley cannot revolve without turning the shaft, or vice versa, unless the key drops out or is shorn in two. The screws, when firmly set up, prevent the dropping out of the key, and also prevent it from rolling in its seats if badly fitted, but they should not be required to perform this latter duty.

When it is necessary to remove the pulley or slide it along the shaft, the set-screws are to be slackened, and a slight force will then shove or drive out the key or slide the pulley over it.

My plan therefore secures all the advantages resulting from the use of a key, and diminishes the labor and expense incidental to its employment, and at the same time affords all the facilities for removal of the pulley or change of its position that are attained by the use of set-screws alone.

I claim as of my own invention—

The combination of a key with a set screw or screws, applied substantially as herein described, as a means for securing pulleys, gear-wheels, arms, and similar articles to shafts.

In testimony whereof I have hereunto subscribed my name.

J. WYATT REID.

In presence of—
THOS. L. THORNELL,
HEYWARD CUTTING.